July 31, 1951     F. PERRY     2,562,387
POWER DRIVEN VINE CUTTER
Filed Feb. 15, 1947     2 Sheets-Sheet 1
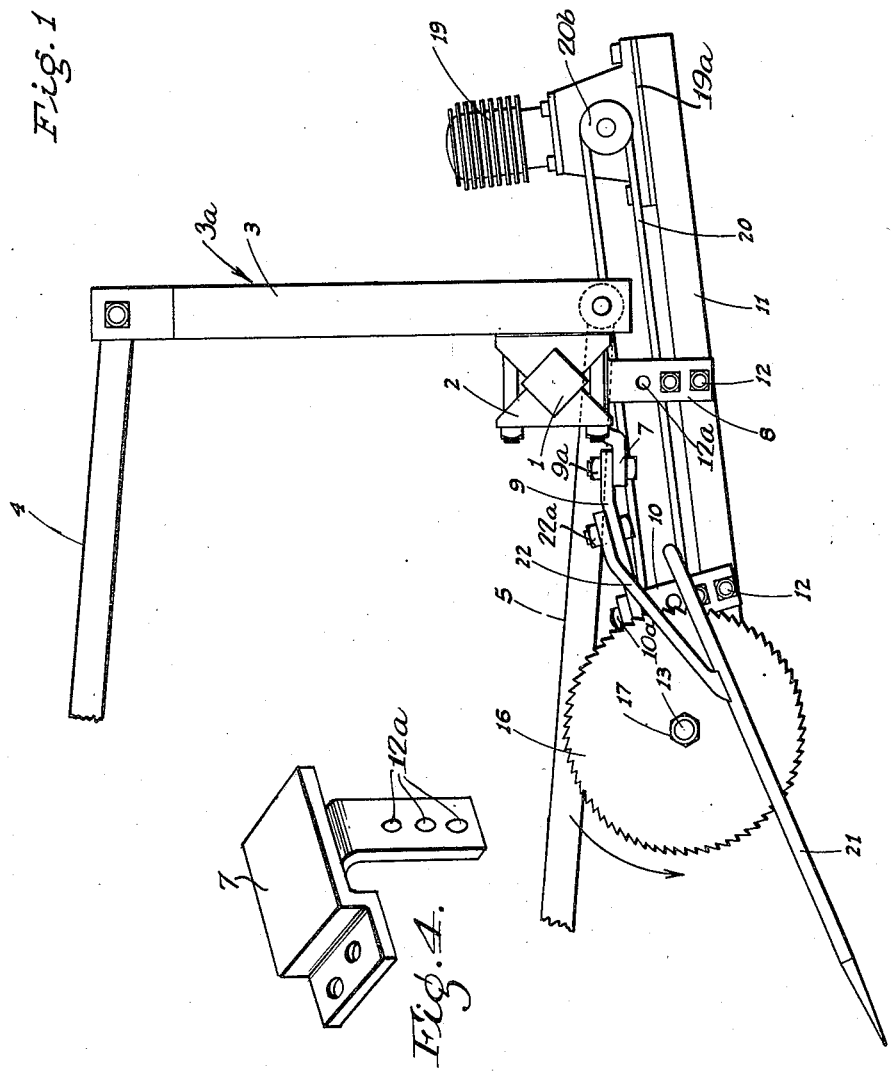
INVENTOR.
Frank Perry
BY
ATTYS July 31, 1951  F. PERRY  2,562,387
POWER DRIVEN VINE CUTTER
Filed Feb. 15, 1947  2 Sheets-Sheet 2
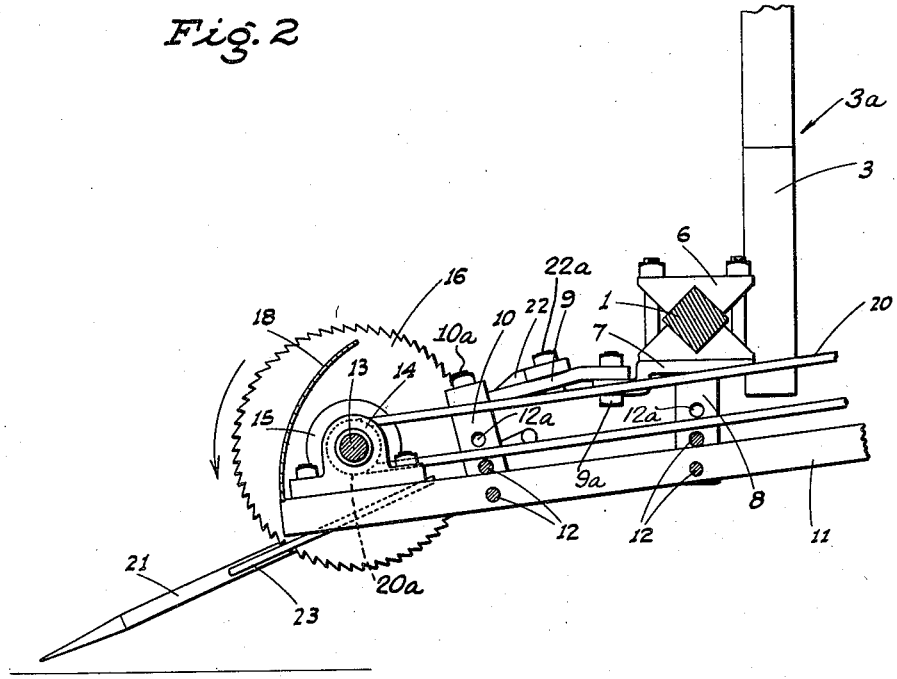
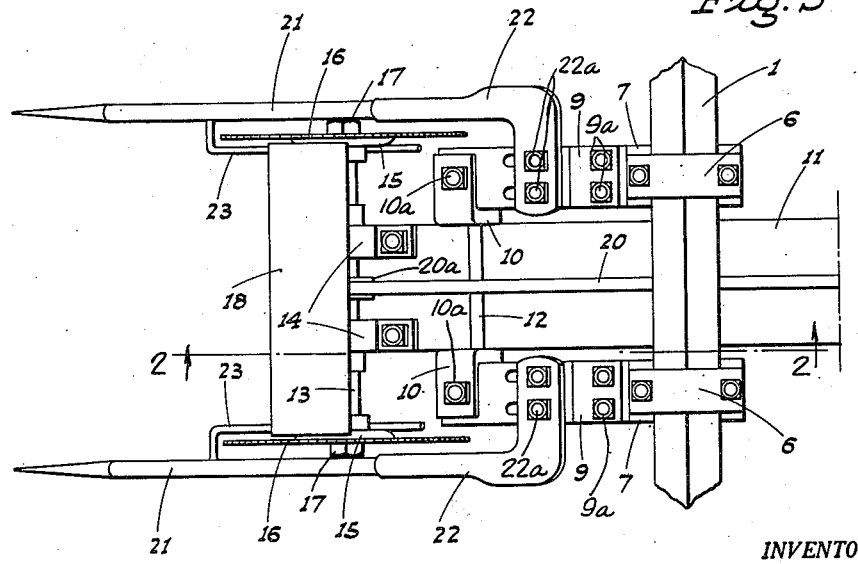
INVENTOR.
Frank Perry
BY
ATTYS Patented July 31, 1951

2,562,387

UNITED STATES PATENT OFFICE 2,562,387

POWER-DRIVEN VINE CUTTER

Frank Perry, Manteca, Calif.

Application February 15, 1947, Serial No. 728,784

5 Claims. (Cl. 56—25.4)

1

This invention relates in general to an improved agricultural implement.

In harvesting certain crops, such as sweet potatoes and yams, it is the practice to dig the same, and pile them on the earth, for drying, in small piles covered with lengths of the vines which remain attached to the tubers. Before digging these tubers, the vines lie along and to the sides of each row, with the vines of adjacent rows entangled. It is therefore necessary that the vines of each row be cut from the vines of adjacent rows before the tubers can be properly dug and piled as above.

One object of the present invention is to provide a novel power driven vine cutter adapted to be tractor mounted, and operative, upon advance of the tractor along a row, to cut the vines on opposite sides of said row but leaving sufficient vines attached to the tubers to cover them after digging and piling of the same.

A further object of the invention is to provide a power driven vine cutter which is adapted to be suspended, as a self-powered unit, from the lift mechanism of a tractor at the rear thereof.

An additional object of the invention is to provide a power driven vine cutter, as above, which comprises, in unitary relation, a longitudinal supporting beam adapted to be suspended rigidly from the tractor lift mechanism, a pair of transversely spaced rotary vine cutters journaled on the beam adjacent its forward end, a gas engine on the beam to the rear thereof, and drive connections between the engine and cutters.

A further object of the invention is to produce a simple, practical, and convenient power driven vine cutter, and yet one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the device, as mounted for use.

Fig. 2 is a longitudinal sectional elevation of the device taken on line 2—2 of Fig. 3.

Fig. 3 is a plan view of the same.

Fig. 4 is a perspective view of one of the attachment plate and suspension arm units detached.

Referring now more particularly to the characters of reference on the drawings, the power driven vine cutter is adapted to be suspended below a transverse, horizontal tool bar 1 secured by conventional agricultural tool-bar clamps 2 in connection with the transversely spaced legs

2

3 of an upstanding A-frame 3a. This A-frame together with the upper and lower links extending forwardly therefrom and indicated at 4 and 5 is part of the standard or conventional draft and power lift arrangement employed with the well-known Ford-Ferguson tractor (not shown).

Between the clamps 2 the tool bar 1 is fitted with another pair of transversely spaced standard two-part clamps 6, disposed with their parts in vertically spaced relation, and to the lower part of each clamp a forwardly projecting attachment plate 7 is secured by welding or the like.

A transversely spaced pair of rear suspension arms 8 are fixed as by welding on, and depend from, the attachment plates 7 directly below the clamps 6 as shown in Fig. 4. Extension bars 9 are secured to, and project forwardly from, the attachment plates 7, and adjacent their forward ends the bars 9 support a pair of transversely spaced front suspension arms 10 which are secured to said bars by bolts 10a.

A rigid supporting beam 11 extends lengthwise of the direction of travel at a slight forward and downward incline; the beam 11 being mounted, intermediate its ends, in connection with the rear and front suspension arms 8 and 10, respectively. Said pairs of rear and front suspension arms are secured to the rigid supporting beam 11 by pairs of cross bolts 12; one bolt of each pair extending through the beam, while the other bolt of each pair extends closely thereabove. Each suspension arm is provided with a vertical row of bolt holes 12a so that the bolts 12 may be supported at different levels in said arms and thus provide for adjustment of the incline of the beam 11 as working conditions may require.

At its forward end the beam 11 is provided with a cross shaft 13 journaled, as at 14, and fitted at opposite ends with arbors 15 carrying rotary vine cutters or circular saws 16, each held in place by a nut 17. The rotary vine cutters 16 are of a diameter such that they project some distance below the beam 11, and between said cutters an upstanding, rearwardly curved vine deflector or shield 18 upstands from the front end of beam 11 and is welded or otherwise suitably secured thereon.

Adjacent the rear end thereof the beam 11 supports a small gas engine 19 by means of an intermediate mounting platform 19a welded on beam 11 and on which the base of the engine is bolted. An endless belt and pulley unit comprising a belt 20 passing about pulleys 20a and 20b on the cross shaft 13 and engine shaft, respectively, connects the engine 19 in driving relation to the rotary vine cutters 16.

A rigid pointed vine pick-up finger 21 is disposed laterally outwardly of each rotary vine cutter 16, but adjacent thereto; said fingers extending from a point rearwardly of the rotary cutters at a forward and downward incline passing below the axis of shaft 13, and terminating at their front ends a considerable distance ahead of, and below, such cutters.

The vine pick-up fingers 21 are rigid with and suspended from L-shaped attachment brackets 22 secured to the extension bar 9 by bolts 22a; said attachment brackets being affixed to the fingers 21 adjacent but short of their rear ends.

Ahead of the rotary vine cutters 16 the fingers 21 are each provided with a deflector rod 23 secured thereto and which extends first laterally inwardly from the finger a short distance, and thence at a rearward and upward incline adjacent the inner face of the corresponding cutter so that the latter passes between the finger and deflecting rod. The rods 23 assure against entanglement of heavy vines or other objects in the rotary parts.

When the above described power driven vine cutter is in operation, the lift mechanism of the tractor is adjusted to a position with the vine pick-up fingers 21 running very close to ground level, if not slightly therebelow. The tractor is then advanced in the field in straddling relation to a crop row, with the rotary vine cutters 16 driven, in the direction indicated by the arrows, by the gas engine 19.

As the tractor advances, the pick-up fingers 21 engage beneath and lift the entangled vines on opposite sides of the row, delivering said vines to the cutters 16, where the entangled vines are effectively and promptly severed. While this cuts the entanglement of vines between adjacent rows, it leaves a length of vine attached to the tubers in the ground, whereby when said tubers are dug and piled, such remaining lengths of vines may then be used to cover the pile in protective relation.

As the rotary vine cutters 16 do not work directly in the soil, they are not subject to any great abrasive action, and remain sharp for relatively long periods of use. The novel form of vine pick-up fingers is such that the entangled vines are delivered to the cutters, and cut thereby, above the actual ground level.

As the power driven vine cutter is of unitary construction, it can be mounted on or removed from, the tractor easily and quickly, merely by attachment or detachment of the clamps 6 which engage the tool bar 1.

Although I here show vertically disposed rotary cutters, a horizontally set cutter will be found to be efficient on certain growths.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A power driven vine cutter comprising a rigid supporting beam, clamp means on the beam, a shaft journaled on the beam adjacent is forward end and transversely of the longitudinal axis of the beam, such shaft projecting to both sides of the beam, a cutter fixed to each end of the shaft for rotation in a vertical plane, an engine mounted on the beam, drive connections between the engine and shaft, and lift means fixed relative to the beam and projecting forwardly thereof and effective to lift vines from the ground and carry them into contact with the cutters.

2. A vine cutter as in claim 1 in which the lift means comprises a pair of vine pick up fingers, each finger being fixed relative to the beam to the rear of one of the cutters and extending thence laterally outward from but adjacent the outer face of such cutter and at a forward and downward inclination to a point ahead of the cutter and below the lower edge thereof.

3. A vine cutter as in claim 2 including a deflector rod fixed to each finger forwardly of the cutter and extending thence rearwardly at an upward incline and adjacent the inner face of the cutter.

4. A vine cutter as in claim 2 including an upwardly and rearwardly curved shield plate fixed to the forward end of the beam and extending between the cutters to points closely adjacent the inner faces of the cutters.

5. A vine cutting unit comprising transversely spaced clamps, an attachment plate on each clamp, a depending suspension arm on each plate, an extension bar projecting forwardly from each plate, a suspension arm on each bar, the suspension arms on the plates and bars being spaced apart longitudinally of the unit, a rigid supporting beam secured to the free ends of the suspension arms, a shaft journaled on the forward end of the rigid beam, a cutter fixed on each end of the shaft for rotation in a vertical plane, an engine on the beam connected in driving relation with the shaft, and an L-shaped bracket fixed to each extension bar, one leg of each bracket projecting alongside of one of the cutters closely adjacent thereto and including a pick-up finger extending forwardly of and below the cutter.

FRANK PERRY.

REFERENCES CITED

The following references are of record in the file of this patent:

UNITED STATES PATENTS

| Number | Name | Date |
|---|---|---|
| 664,406 | Harms | Dec. 25, 1900 |
| 1,301,829 | Foutz | Apr. 29, 1919 |
| 1,476,521 | Kell | Dec. 4, 1923 |
| 1,891,526 | Dupuis | Dec. 20, 1932 |
| 2,078,730 | Long | Apr. 27, 1937 |
| 2,344,663 | Wood | Mar. 21, 1944 |
| 2,352,506 | Zirckel | June 27, 1944 |
| 2,365,408 | Hillyer | Dec. 19, 1944 |
| 2,413,355 | Johnson | Dec. 31, 1946 |
| 2,413,873 | Hume | Jan. 7, 1947 |